(12) United States Patent
Knebel et al.

(10) Patent No.: US 7,508,507 B2
(45) Date of Patent: Mar. 24, 2009

(54) DEVICE FOR SELECTING AND DETECTING AT LEAST TWO SPECTRAL REGIONS OF A LIGHT BEAM

(75) Inventors: Werner Knebel, Kronau (DE); Gabriele Burger, Heidelberg (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 142 days.

(21) Appl. No.: 11/247,750

(22) Filed: Oct. 11, 2005

(65) Prior Publication Data

US 2006/0077383 A1 Apr. 13, 2006

Related U.S. Application Data

(60) Provisional application No. 60/714,919, filed on Sep. 7, 2005.

(30) Foreign Application Priority Data

Oct. 12, 2004 (DE) .................. 10 2004 049 770

(51) Int. Cl.
*G01J 3/28* (2006.01)
(52) U.S. Cl. .................. 356/326; 356/319
(58) Field of Classification Search .............. 356/328, 356/329
See application file for complete search history.

(56) References Cited

U.S. PATENT DOCUMENTS

| | | | | |
|---|---|---|---|---|
| 4,730,922 A | * | 3/1988 | Bach et al. | 356/73 |
| 5,139,335 A | * | 8/1992 | Lundeen et al. | 356/328 |
| 5,159,199 A | * | 10/1992 | LaBaw | 250/339.02 |
| 5,420,681 A | * | 5/1995 | Woodruff | 356/326 |
| 6,528,791 B1 | * | 3/2003 | Williams et al. | 250/339.13 |
| 6,785,002 B2 | * | 8/2004 | Zarrabian et al. | 356/454 |
| 2002/0158211 A1 | * | 10/2002 | Gillispie | 250/458.1 |
| 2003/0231825 A1 | * | 12/2003 | Olschewski | 385/27 |
| 2005/0213092 A1 | * | 9/2005 | MacKinnon et al. | 356/336 |
| 2005/0270524 A1 | * | 12/2005 | Wang et al. | 356/326 |
| 2007/0037135 A1 | * | 2/2007 | Barnes et al. | 435/4 |

FOREIGN PATENT DOCUMENTS

DE 101 02 033 8/2002

OTHER PUBLICATIONS

Ocean Optics website, anonymous, "Linear Variable Filters", retrieved from: http://web.archive.org/web/20031011051229/oceanoptics.com/Products/LinearVariableFilters.asp, dated Oct. 11, 2003, retrieved May 16, 2007.*

* cited by examiner

*Primary Examiner*—Kara E Geisel
(74) *Attorney, Agent, or Firm*—Darby & Darby

(57) ABSTRACT

An apparatus for selecting and detecting at least two spectral regions of a light beam includes a selection device, a detection device, and a light suppression device. The light suppression device suppresses reflected and/or scattered light of an illuminating light of a microscope. The light suppression device is located in an optical path between the selection device and the detection device, and includes a graded filter.

17 Claims, 4 Drawing Sheets

DEVICE FOR SELECTING AND DETECTING AT LEAST TWO SPECTRAL REGIONS OF A LIGHT BEAM

Priority is claimed to the provisional application entitled "Device for the Selection and Detection of at Least Two Spectral Regions of a Light Beam," filed on Sep. 7, 2005, by applicants, and to German patent application DE 10 2004 049 770.2, the entire subject matters of both of which are hereby incorporated by reference herein.

The present invention relates to a device for selecting and detecting at least two spectral regions of a light beam, including a selection device and a detection device; a means for suppressing reflected and/or scattered light of an illuminating light of a microscope being placed in the optical path between the selection device and the detection device. The present invention also relates to a microscope, especially a scanning microscope, containing such a device.

BACKGROUND

Devices for selecting and detecting at least two spectral regions of a light beam are known in the field and described, for example, in the form of a spectral detector in German Patent Application DE 101 02 033 A1. From DE 101 02 033 A1, in particular, it is known for a means for suppressing reflected and/or scattered light of an illuminating light of a microscope to be placed in the detection beam path before the detection device. In this connection, it is possible to suppress light of one excitation wavelength produced by a laser.

There are applications for which the suppression of reflected and/or scattered light using the known means is inadequate. Even when using, for example, a spectral detector and an AOBS, which together suppress excitation wavelengths by a factor of $10^{-6}$ (spectral detector $10^{-4}$ to $10^{-5}$ and AOBS $10^{-2}$), the amount of residual scattered light of the excitation wavelengths entering the spectral detector is often still so high that the dynamics, that is, the signal-to-noise ratio is thereby significantly reduced. An efficient bandpass filter already provides a suppression of $10^{-6}$. When combined with an efficient dichroic beam splitter with a residual transmission of the excitation wavelength of about 1%, the resulting total suppression is about $10^{-8}$. However, particularly for samples that are viewed close to the cover slip and which yield a low intensity of the excitation light and/or reflected light, residual light suppression using a spectral detector and an AOBS is not sufficient because both signals are of about the same order of magnitude.

SUMMARY OF THE INVENTION

It is an object of the present invention to provide a device and a microscope for selecting and detecting at least two spectral regions of a light beam that will enable especially high dynamics to be achieved using structurally simple means.

The present invention provides a device for selecting and detecting at least two spectral regions of a light beam. The device includes a selection device and a detection device. A means for suppressing reflected and/or scattered light of an illuminating light of a microscope is placed in the optical path between the selection device and the detection device. The means for suppressing includes a graded filter.

In accordance with the present invention, it was discovered that the use of a special filter allows reflected and/or scattered light of an illuminating light to be suppressed to a particularly high degree. More specifically, in accordance with the present invention, the means for suppressing reflected and/or scattered light is designed to include a graded filter for this purpose. Using a graded filter enables particularly accurate adaptation to wavelengths and bandwidths of wavelengths to be suppressed. This makes it possible to examine even samples that are viewed close to the cover slip and which yield a low intensity of the excitation light and/or reflected light.

Accordingly, the device of the present invention provides a device which allows especially high dynamics to be achieved with structurally simple means.

With a view to allowing the graded filter to be positioned in a particularly simple manner while, at the same time, providing high efficiency, the graded filter could be placed between a mirror slide and a detector of the detection device. This allows the excitation wavelength or excitation wavelengths to be suppressed in an especially reliable manner. Specifically, the graded filter could be placed in a multiband detector between the mirror slide and a photomultiplier.

With a view to allowing the graded filter to be used in a versatile manner, the graded filter could include long-pass filters having different characteristics. In other words, different long-pass filters could be incorporated into the graded filter. In this manner, for example, one or more channels, or all channels, of a detector or photomultiplier could respectively be assigned individual filters in the form of, for example, the long-pass filters. This allows reflected and/or scattered light to be suppressed in an especially reliable and individual manner.

To ensure particularly high levels of flexibility and adaptability to the type of spectral dispersion in question, the long-pass filters could be replaceable. This allows the graded filter to be individually configured and matched to the specific application.

Graded filters are commercially available, for example, from Ocean Optics, under the name of "LVF-H High-Pass Filter". These filters are linear variable filters.

Specifically, the graded filter could be designed such that the long-pass filters are disposed one behind the other. The long-pass filters could be arranged together on a common substrate, leading to a structurally particularly simple and compact design. This would allow simple handling of the entire graded filter.

The selection device of a device for selecting and detecting at least two spectral regions of a light beam usually contains a spectrally dispersive element, which may, for example, be a grating or a prism. With a view to allowing reflected and/or scattered light to be suppressed in a particularly effective manner, the graded filter could have a filter structure which is substantially and preferably exactly matched or adapted to the spectral dispersion of the spectrally dispersive element of the selection device, preferably at the location of graded filter. In other words, here the graded filter is designed to, preferably exactly, match the spectrally dispersive element.

In particular if the selection device contains a linear dispersive element, the filter structure of the graded filter could be adapted to the segments of a line detector of the detection device in such a way that there is always only one precisely selectable spectral component incident on the line segment. In this manner, any scattered or reflected light would be suppressed. Specifically, this could be accomplished using a grating as a linear dispersive element together with a multianode photomultiplier.

When using a nonlinear dispersive element, such as a prism, the filter structure of the graded filter could also be adapted to this nonlinear dispersive element of the selection device. The graded filter of the present invention has a degree of variability that allows adaptation to both linear and nonlinear dispersive elements.

In an embodiment, the detection device could include a photomultiplier, which could take the form of a multi-anode or multi-channel photomultiplier.

The graded filter or filters could be fixedly disposed in front of the photomultiplier near the focal line. When calibrated together with a mirror slide or slides, the graded filter or filters does/do not need to be moved anymore.

Microlenses could be used to image the spectral regions onto the graded filter or filters or onto the detection device.

The present invention also provides a microscope containing a device according to the present invention for selecting and detecting at least two spectral regions of a light beam. Regarding the design of the microscope in terms of the device for selecting and detecting at least two spectral regions of a light beam, reference is made to the above description in order to avoid repetitions. In an embodiment, the microscope is a scanning microscope.

The device of the present invention provides a device having considerably increased dynamics. Disturbing scattered and reflected light is significantly suppressed. The graded filters used according to the present invention are also referred to as "graded index filters".

BRIEF DESCRIPTION OF THE DRAWINGS

The teaching of the present invention can be embodied and refined in various ways. In this regard, reference is made to the following description of preferred exemplary embodiments of the inventive device for selecting and detecting at least two spectral regions of a light beam. In conjunction with the explanation of the preferred exemplary embodiments with reference to the drawings, an explanation is also given of generally preferred embodiments and developments of the teaching.

DETAILED DESCRIPTION

Figure 1:
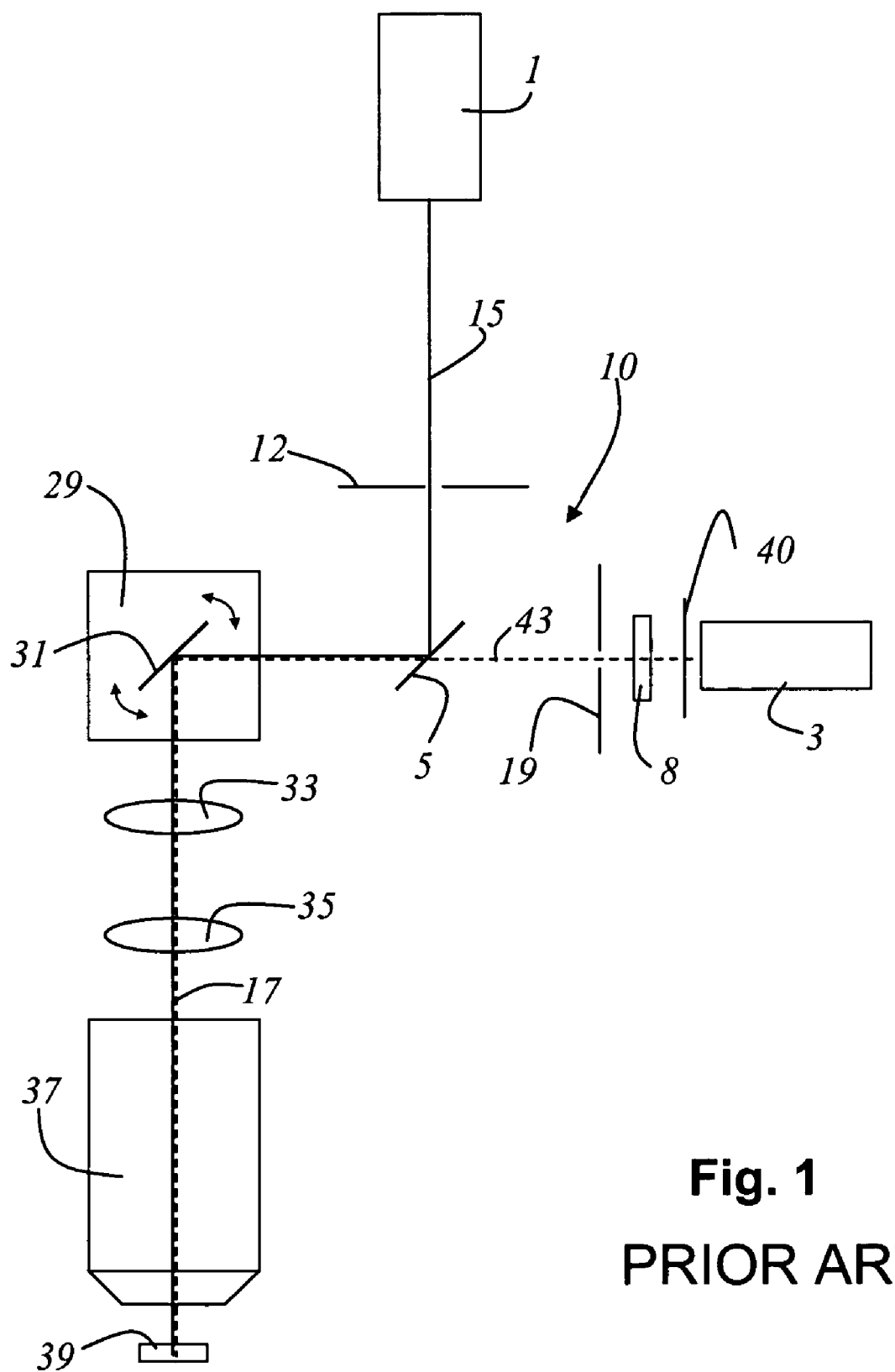
FIG. 1 schematically illustrates a scanning microscope according to the prior art having a means for suppressing reflected and/or scattered light of an illuminating light.

FIG. 1 schematically shows a scanning microscope 10 according to the prior art having a light source 1 in the form of a laser. The illuminating light beam 15 produced by the laser is passed through an illumination pinhole 12, via a dichroic beam splitter 5, and to a scanning module 29 containing a gimbal-mounted scanning mirror 31. Said gimbal-mounted scanning mirror directs illuminating light beam 15 via a scanning optical system 33, optical system 35, and through microscope optical system 37, and passes it over or through a sample 39. Light 43 emanating from the sample defines an observation beam path 17 and goes through microscope optical system 37 and via scanning module 29 to dichroic beam splitter 5, passes therethrough and impinges on a detector 3 in the form of a single photomultiplier. In the process, light 43 passes through a detection pinhole 19 and an optical system 8. A means 40 for suppressing reflected and/or scattered light is placed in front of detector 3.

Figure 2:
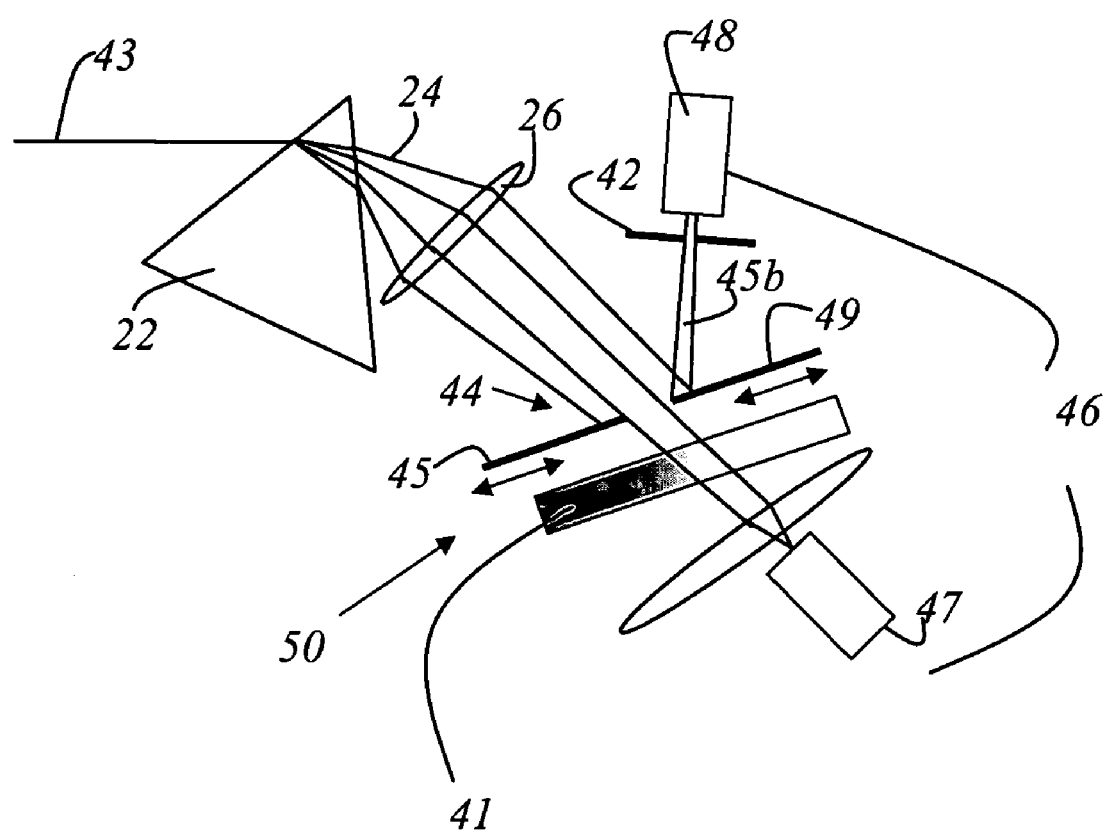
FIG. 2 is a schematic view of a first exemplary embodiment of an inventive device for selecting and detecting at least two spectral regions of a light beam.

FIG. 2 is a schematic view of a first exemplary embodiment of an inventive device for selecting and detecting at least two spectral regions of a light beam. Light 43 is imaged onto a spectral dispersion element 22 via an optical system. Element 22 is formed of a prism. Dispersed light beam 24 passes through a focusing means 26 and impinges on a slit detector system 50. Slit detector system 50 is used to detect two spectral regions of dispersed light beam 24. For this purpose, there are provided a selection device 44 and a detection device 46. Selection device 44 includes means 45 for separating out a first spectral region and, on the other hand, for reflecting at least a portion 45b of the spectral region that is not separated out. Detection device 46 includes a first detector 47 disposed in the optical path of the first spectral region that is separated out as well as a second detector 48 disposed in the optical path of reflected portion 45b of the spectral region. Graded filter 41 is disposed between means 45 and first detector 47.

FIG. 2 further shows that an aperture 42 is disposed in front of detector 48, said aperture allowing selection of a further portion of reflected spectral region portion 45b before it reaches second detector 48. Means 45 for separating out each take the form of a slit aperture; each of the surfaces facing the incident light being provided with a totally reflecting coating 49 to reflect at least a portion of the spectral region that is not separated out. Means 45 for separating out can be mechanically moved in the directions indicated by the double arrows in FIG. 2 to implement a mirror slide 45 and to thereby select a desired spectral region for the examination. In the exemplary embodiment shown here, the graded filter is disposed between first detector 47 and means 45 for separating out the first spectral region.

Figure 3:
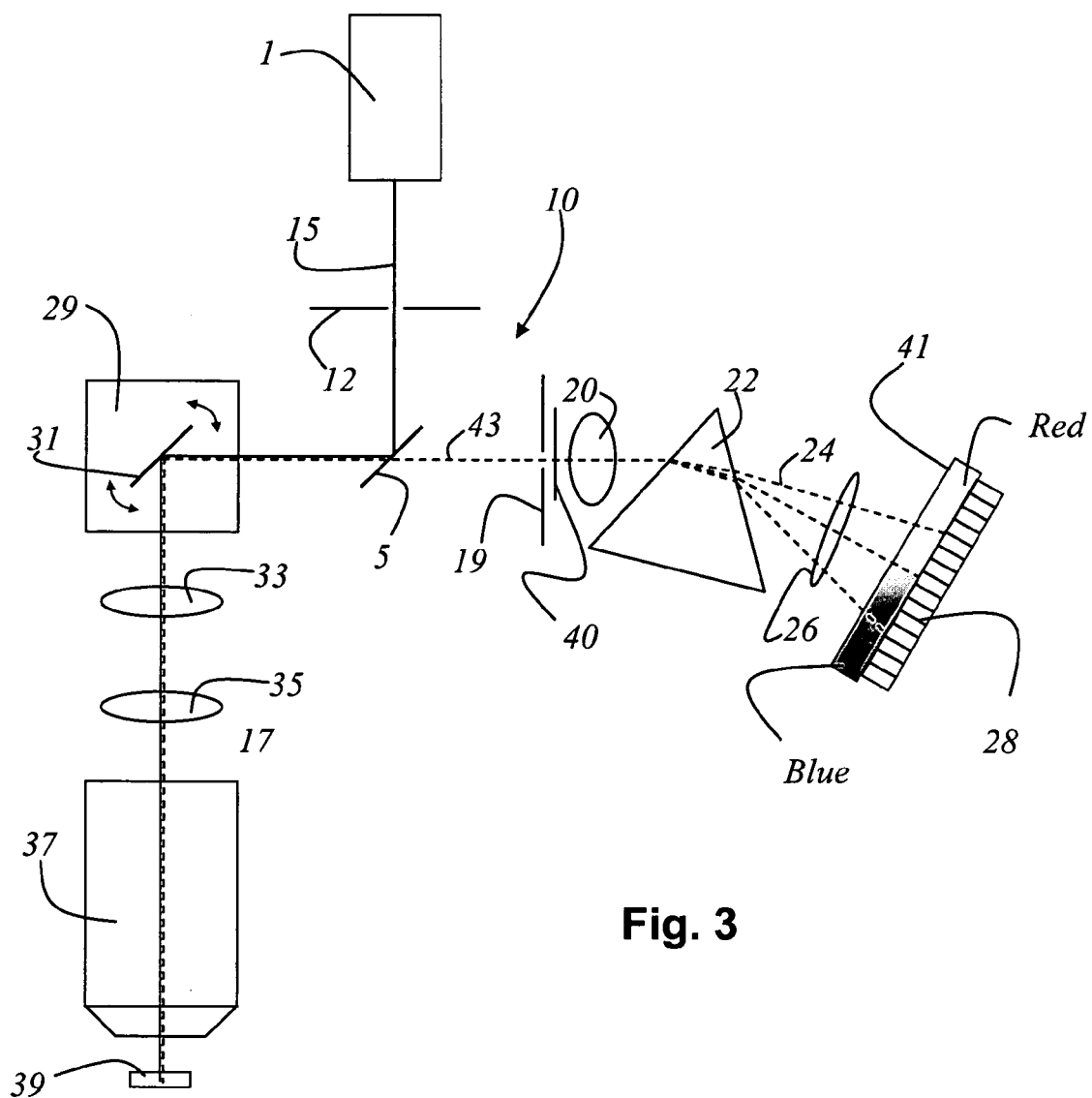
FIG. 3 is a schematic view of a second exemplary embodiment of an inventive device for selecting and detecting at least two spectral regions of a light beam, the device being disposed in a scanning microscope.

FIG. 3 is a view including the scanning microscope 10 of FIG. 1, and also including a second exemplary embodiment of an inventive device for selecting and detecting at least two spectral regions of a light beam 43. The device contains a spectral dispersion element 22 in the form of a prism. Optical system 20 is disposed upstream of prism 20. Dispersed light beam 24 passes through a focusing means 26 and is imaged onto graded filter 41, which is disposed on a multi-channel photomultiplier 28.

Figure 4A:
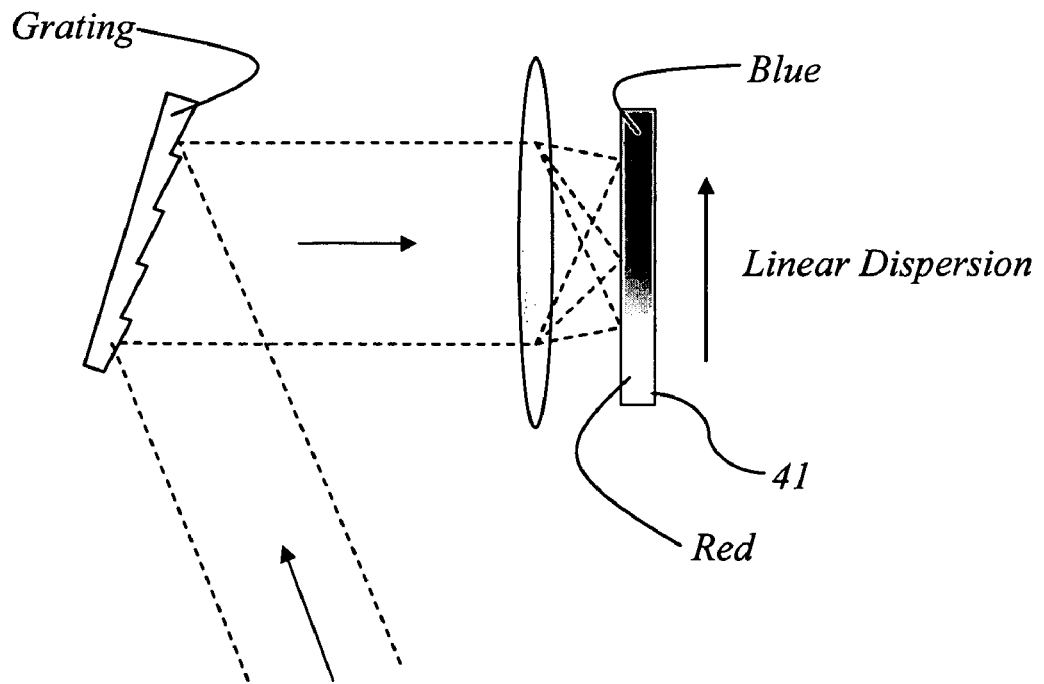
FIG. 4a schematically illustrates the arrangement of a graded filter for a linear dispersive grating.

FIG. 4a schematically shows the combination of graded filter 41 with a grating which linearly disperses the light emanating from the sample.

Figure 4B:
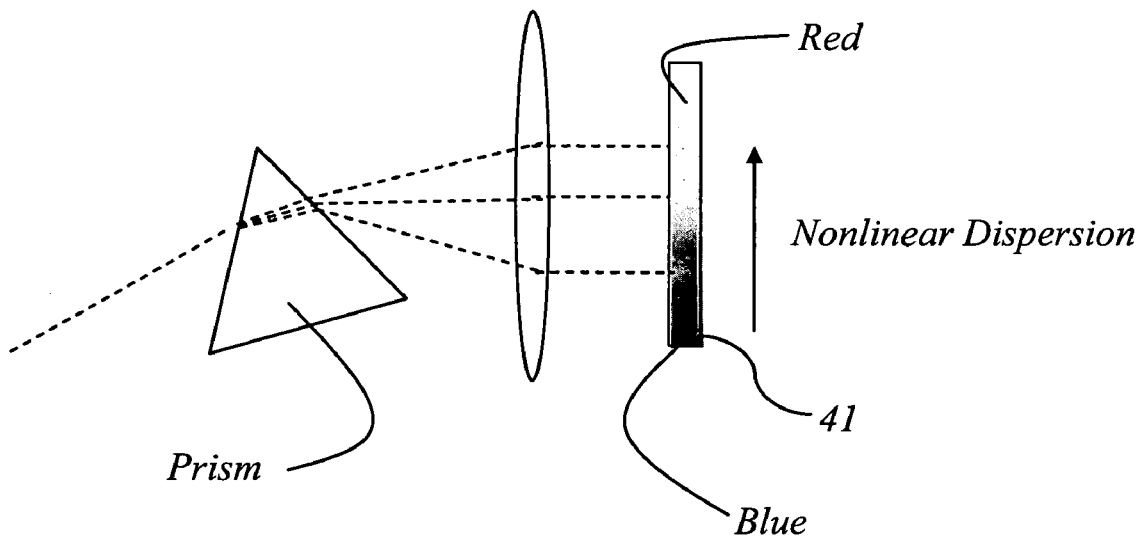
FIG. 4b schematically illustrates the arrangement of a graded filter for a nonlinear dispersive prism.

FIG. 4b schematically shows the combination of a graded filter 41 with a prism which provides nonlinear dispersion.

In the case of both linear dispersion and nonlinear dispersion, the filter structure of graded filter 41 can be configured to be exactly adapted to the respective spectral dispersion. The dispersion profile can be mapped by graded filter 41. In other words, the selection and arrangement of different long-pass filters can be such that the individual long-pass filters provide matching to individual spectral regions of the dispersed light. In this manner, residual light is suppressed in a particularly effective manner.

Finally, it should be particularly noted that the exemplary embodiments described above serve merely for discussion of the claimed teaching without limiting it to the exemplary embodiments.

What is claimed is:

1. An apparatus for selecting and detecting at least two spectral regions of a light beam, the apparatus comprising:

an illuminating optical system configured to direct illuminating light onto a sample so as to produce detection light along a detection beam path;

a selection device disposed in the detection beam path, the selection device including a mirror slide;

a detection device disposed in the detection beam path, the detection device including a detector;

a light suppression device configured to suppress at least one of reflected and scattered light of the illuminating light, the light suppression device being disposed in the detection beam path between the selection device and the detection device, the light suppression device including a graded filter, the graded filter being disposed between the mirror slide and the detector; and at least one microlens configured to image the spectral regions onto at least one of the graded filter and the detection device, and wherein the graded filter includes a plurality of long-pass filters each having a respective different characteristic.

2. The apparatus as recited in claim 1 wherein the long-pass filters are replaceable.

3. The apparatus as recited in claim 1 wherein the long-pass filters are disposed one behind the other.

4. The apparatus as recited in claim 1 wherein the long-pass filters are disposed together on a common substrate.

5. The apparatus as recited in claim 1 wherein the selection device includes a spectrally dispersive element.

6. The apparatus as recited in claim 5 wherein the graded filter has a filter structure substantially adapted to a spectral dispersion of the spectrally dispersive element.

7. The apparatus as recited in claim 6 wherein the graded filter has a filter structure exactly matched to the spectral dispersion of the spectrally dispersive element.

8. The apparatus as recited in claim 6 wherein the graded filter has a filter structure substantially adapted to the spectral dispersion of the spectrally dispersive element at a location of the graded filter.

9. The apparatus as recited in claim 1 wherein the detection device includes a line detector, and wherein a filter structure of the graded filter is adapted to segments of the line detector so that there is only one selectable spectral component incident on a line segment.

10. The apparatus as recited in claim 9 wherein the selection device includes a linear dispersive element.

11. The apparatus as recited in claim 9 wherein the linear dispersive element includes a grating.

12. The apparatus as recited in claim 1 wherein the selection device includes a nonlinear dispersive element, and wherein a filter structure of the graded filter is adapted to the nonlinear dispersive element.

13. The apparatus as recited in claim 12 wherein the nonlinear dispersive element includes a prism.

14. The apparatus as recited in claim 1 wherein the detection device includes a photomultiplier.

15. The apparatus as recited in claim 14 wherein the photomultiplier includes at least one of a multi-anode and a multi-channel photomultiplier.

16. A microscope comprising:

a light source configured to produce illuminating light and direct the illuminating light onto a sample so as to produce detection light along a detection beam path; and an apparatus for selecting and detecting at least two spectral regions of the detection light, the apparatus including:

a selection device disposed in the detection beam path, the selection device including a minor slide;

a detection device disposed in the detection beam path, the detection device including a detector;

a light suppression device configured to suppress at least one of reflected and scattered light of the illuminating light, the light suppression device being disposed in the detection beam path between the selection device and the detection device, the light suppression device including a graded filter, the graded filter being disposed between the mirror slide and the detector; and at least one microlens configured to image the spectral regions onto at least one of the graded filter and the detection device, and wherein the graded filter includes a plurality of long-pass filters each having a respective different characteristic.

17. The microscope as recited in claim 16 further comprising a scanning device.

* * * * *